US011884268B2

United States Patent
Seegmiller et al.

(10) Patent No.: US 11,884,268 B2
(45) Date of Patent: Jan. 30, 2024

(54) MOTION PLANNING IN CURVILINEAR COORDINATES FOR AUTONOMOUS VEHICLES

(71) Applicant: FORD GLOBAL TECHNOLOGIES, LLC, Dearborn, MI (US)

(72) Inventors: Neal Seegmiller, Pittsburgh, PA (US); Patrick Barone, San Francisco, CA (US); Ed Venator, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 17/104,937

(22) Filed: Nov. 25, 2020

(65) Prior Publication Data

US 2022/0161791 A1 May 26, 2022

(51) Int. Cl.
*B60W 30/095* (2012.01)
*B60W 60/00* (2020.01)
*B60W 40/10* (2012.01)

(52) U.S. Cl.
CPC ........ *B60W 30/0956* (2013.01); *B60W 40/10* (2013.01); *B60W 60/0027* (2020.02);
(Continued)

(58) Field of Classification Search
CPC ............... B60W 30/08; B60W 30/095; B60W 30/0956; B60W 40/072; B60W 40/04; B60W 40/10; B60W 40/114; B60W 50/0097; B60W 60/0027; B60W 60/00272; B60W 60/00274; B60W 2420/42; B60W 2420/52; B60W 2420/54; B60W 2420/403; B60W 2520/14; B60W 2552/30;
(Continued)

(56) References Cited

U.S. PATENT DOCUMENTS 10,096,251 B2 10/2018 Rysdyk
10,152,056 B2 12/2018 Rohde et al.
(Continued)

FOREIGN PATENT DOCUMENTS

DE 102018008599 A1 4/2020

OTHER PUBLICATIONS

Choset, H., "Robotic Motion Planning: Configuration Space", Robotics Institute 16-735, available at https://www.cs.cmu.edu/~motionplanning/lecture/Chap3-Config-Space_howie.pdf, accessed Apr. 20, 2020.
(Continued)

*Primary Examiner* — Russell Frejd
*Assistant Examiner* — Brandon Z Willis
(74) *Attorney, Agent, or Firm* — Frank A. Mackenzie; Brooks Kushman, P.C.

(57) ABSTRACT

Methods for planning a trajectory for an autonomous vehicle are disclosed. A vehicle motion planning system will determine a reference curve that represents a path via which the vehicle may travel. The system will detect an actor that is moving in the environment. The system will segment the reference curve according to time intervals. For each of the time intervals, the system will identify a bounding geometry for the actor, predict a lateral offset distance between the reference curve and the actor, and use the predicted lateral offset distance to determine whether to alter a planned trajectory for the autonomous vehicle.

20 Claims, 11 Drawing Sheets

(52) U.S. Cl.
CPC ..... *B60W 2420/42* (2013.01); *B60W 2420/52* (2013.01); *B60W 2420/54* (2013.01); *B60W 2554/404* (2020.02); *B60W 2554/801* (2020.02)

(58) Field of Classification Search
CPC ....... B60W 2554/404; B60W 2554/80; B60W 2554/801; B60W 2754/20; B60W 2754/10; G08G 1/166; G08G 1/16
See application file for complete search history.

(56) References Cited

U.S. PATENT DOCUMENTS

| | | | |
|---|---|---|---|
| 11,004,000 B1* | 5/2021 | Gutmann | B60W 30/0956 |
| 11,225,247 B2* | 1/2022 | Beller | B60W 30/18154 |
| 2015/0120137 A1 | 4/2015 | Zeng et al. | |
| 2017/0039855 A1* | 2/2017 | Maeda | B60W 30/09 |
| 2017/0132930 A1* | 5/2017 | Ando | G08G 1/161 |
| 2018/0001952 A1* | 1/2018 | Rajamani | B62J 45/41 |
| 2019/0196485 A1* | 6/2019 | Li | G01C 21/3407 |
| 2019/0361450 A1 | 11/2019 | Sheckells et al. | |
| 2020/0086854 A1* | 3/2020 | Liu | B60W 30/0956 |
| 2021/0046927 A1* | 2/2021 | Miller | B60W 30/095 |
| 2021/0197809 A1* | 7/2021 | Trukhanovich | G06T 7/70 |
| 2021/0261118 A1* | 8/2021 | Xu | B60W 10/20 |

OTHER PUBLICATIONS

Fan, H. et al., "Baidu Apollo EM Motion Planner", arXiv:1807.08048 [cs.RO], Jul. 20, 2018.

Gonzales, D. et al., "A Review of Motion Planning Techniques for Automated Vehicles," published in IEEE Transactions on Intelligent Transportation Systems, vol. 17, No. 4 (Apr. 2016) (Abstract).

Héry, E. et al., "Map-Based Curvilinear Coordinates for Autonomous Vehicles", IEEE Intelligent Transportation Systems Conference (ITSC 2017), Oct. 2017, Yokohama, Japan, hal-01596909v2, available at https://hal.archives-pouvertes.fr/hal-01596909v2.

Kim, J. et al., "Curvilinear-Coordinate-Based Object and Situation Assessment for Highly Automated Vehicles", IEEE Transactions on Intelligent Transportation Systems, Jun. 2015, 16(3):1-17, available at https://www.researchgate.net/publication/273303105_Curvilinear-Coordinate-Based_Object_and_Situation_Assessment_for_Highly_Automated_Vehicles.

Werling, M. et al., "Optimal Trajectory Generation for Dynamic Street Scenarios in a Frenét Frame", 2010 IEEE International Conference on Robotics and Automation, Anchorage Convention District, May 3-8, 2010, Anchorage, Alaska, USA.

Xu, W. et al., "A Real-Time Motion Planner with Trajectory Optimization for Autonomous Vehicles", 2012 IEEE International Conference on Robotics and Automation, Saint Paul, MN, 2012, pp. 2061-2067, doi: 10.1109/ICRA.2012.6225063. available at https://www.ri.cmu.edu/pub_files/2012/5/ICRA12_xuwd_Final.pdf.

Yurtsever, E., et al., "A Survey of Autonomous Driving: Common Practices and Emerging Technologies" IEEE Access, vol. 8 (arXiv Apr. 2, 2020).

International Search Report of PCT/US2021/057753 dated Jan. 16, 2022, 3 pages.

Written Opinion of PCT/US2021/057753 dated Jan. 20, 2022, 4 pages.

International Preliminary Report on Patentability dated May 30, 2023, 5 pages.

* cited by examiner

MOTION PLANNING IN CURVILINEAR COORDINATES FOR AUTONOMOUS VEHICLES

BACKGROUND

An autonomous vehicle (AV) must have a motion planning system to plan trajectories for the AV to execute. Each trajectory will include a path and a temporal solution (i.e., the correlation of times to points along the path, representing the times at which the AV will traverse the points on the path). Planned trajectories should be: (i) dynamically feasible for the AV to execute; (ii) safe (i.e., the trajectories will maintain sufficient distance from other road users and obstacles); (iii) compliant with rules of the road such as speed limits, lane markings, and the like; and (iv) comfortable for riders within the vehicle (for example, by avoiding extreme acceleration and/or jerk).

Motion planning for AVs is computationally challenging because it is high-dimensional. At minimum, the state space for the AV will include the pose of the vehicle on a manifold defined by a map (which includes x, y and yaw components) at each point in time. In order to plan feasible and comfortable trajectories, the state space also may include higher-order terms, such as velocity, acceleration and curvature.

To reduce dimensionality in AV motion planning calculation, AVs may implement motion planning in curvilinear coordinates, which is sometimes also referred to as planning in the "Frenét frame." In the Frenét frame, the AV's three fundamental states in Cartesian coordinates {x, y, yaw} are replaced with two states {s, l}, where s is the distance along a reference curve and l is the lateral deviation of the vehicle from the reference curve. The reference curve is typically a continuous path through the center of a lane, although curvilinear coordinates are not necessarily limited to this exact positioning of the reference curve. Examples of such processes are disclosed in papers such as Héry et al., "Map-based Curvilinear Coordinates for Autonomous Vehicles," IEEE Intelligent Transportation Systems Conference (2017).

While planning motion of an AV in curvilinear coordinates does help reduce dimensionality of the state space, the process is still mathematically challenging and requires a significant amount of processing resources. Mathematical challenges include: the transform from Cartesian to curvilinear coordinates is not a 1:1 mapping, and the mapping can be ambiguous near the center of curvature of each reference curve. For example, FIG. 1 illustrates a reference curve 101 in Cartesian coordinates in which an object 103 is positioned near the center of curvature of the reference curve 101. Because the object 103 is equally distant to multiple points along the reference curve at this location, the position of object 103 in curvilinear coordinates would be ambiguous. Computational challenges arise because most other road users are also moving, so distances to moving actors must be computed as a function of time, and those distances must be re-computed whenever the projected motion of another actor changes. Distances also must be re-computed when the reference curve changes, which may occur when the AV moves into another lane or otherwise changes its planned path.

This document describes methods and systems that are directed to addressing the problems described above, and/or other issues.

SUMMARY

In various embodiments, to plan a trajectory for an autonomous vehicle, a motion planning system of the vehicle will determine a reference curve that represents a path via which the autonomous vehicle may travel in an environment over a time horizon. The motion planning system will receive, from a perception system of the autonomous vehicle, data representative of an actor that is moving in the environment. The motion planning system will segment the time horizon into a plurality of time intervals. For each of the time intervals, the motion planning system will identify a bounding geometry for the actor, wherein the bounding geometry represents a region of interest that surrounds the actor. The motion planning system will predict a lateral offset distance between the reference curve and the actor, and it will use the predicted lateral offset distances to determine a trajectory for the autonomous vehicle.

In some embodiments, the motion planning system may store the predicted lateral offset distances in a lookup table. If so, then when using the predicted lateral offset distances to determine a trajectory for the autonomous vehicle, the system may retrieve the predicted lateral offset distances from the lookup table when the moving actor is in proximity to the autonomous vehicle.

In some embodiments, using the predicted lateral offset distance to determine a trajectory for the autonomous vehicle may include determining, from the predicted lateral offset distance, one or more regions of configuration space for the autonomous vehicle that are occupied by the actor, and one or more regions of configuration space for the autonomous vehicle that are free of the actor. The system may determine whether a planned trajectory for the autonomous vehicle will conflict with any of the occupied regions of a configuration space. When the planned trajectory for the autonomous vehicle will conflict with any of the occupied regions of the configuration space, the system may alter the planned trajectory to be fully within a free configuration space for the autonomous vehicle and outside of an occupied configuration space for the autonomous vehicle.

In some embodiments, using the predicted lateral offset distance to determine a trajectory for the autonomous vehicle includes: determining one or more regions of configuration space for the autonomous vehicle that are occupied; determining one or more regions of configuration space for the autonomous vehicle that are free; and determining a planned trajectory that is fully within a region of free configuration space for the autonomous vehicle and outside of all regions of occupied configuration space for the autonomous vehicle.

In some embodiments, identifying the bounding box for the actor and predicting the lateral offset distance between the reference curve and the actor comprises, for each of the time intervals: (i) determining a coarse bounding geometry for the actor over the time interval; and (ii) determining whether the coarse bounding geometry for the actor will intersect with a coarse bounding geometry the autonomous vehicle over a distance interval on the reference curve. If the coarse bounding geometry for the actor will not intersect with the coarse bounding geometry for the autonomous vehicle, then the system may move to a next time or distance interval without predicting a lateral offset distance for that time or distance interval. If the coarse bounding geometry for the actor will intersect with the coarse bounding geometry for the autonomous vehicle, then the system may determine a plurality of fine bounding geometries for the actor over time subintervals and fine bounding geometries for the autonomous vehicle over distance subintervals, and the system may then determine lateral offset distances in each location where the fine bounding geometries of the actor and the autonomous vehicle intersect. In some embodiments, the motion planning system may determine the coarse bounding geometry for the autonomous vehicle by determining a bounding box for the autonomous vehicle, and by dilating the bounding box for the autonomous vehicle laterally by a threshold.

In some embodiments, identifying the bounding geometry for the actor and predicting the lateral offset distance between the reference curve and the actor comprises, for each of the time intervals: (i) subdividing the time interval into time subintervals; (ii) for each of the time subintervals, determining a fine bounding geometry for the actor; (iii) determining a distance interval that corresponds to the time interval, and subdividing the distance interval on the reference curve into a plurality of distance subintervals; (iv) for each of the distance subintervals, determining a fine bounding geometry for the autonomous vehicle; (v) identifying pairs of the time intervals and corresponding distance subintervals and, for each time subinterval and distance subinterval pair; and (vi) determining whether the fine bounding geometry for the actor intersects with the fine bounding geometry for the autonomous vehicle. If the fine bounding geometry for the actor does not intersect with the fine bounding geometry for the autonomous vehicle, then the system may continue to a next time subinterval. If the fine bounding geometry for the actor intersects with the fine bounding geometry for the autonomous vehicle, then the system may predict the lateral offset to a bounding geometry of the actor over the time subinterval at sample locations on the reference curve within the distance subinterval.

In some embodiments, predicting the lateral offset distance between the autonomous vehicle and the moving actor may include determining a distance between a bounding box for the autonomous vehicle and a convex hull of the moving actor.

In some embodiments, wherein identifying the bounding box for the actor and predicting the lateral offset distance between the reference curve and the actor comprises, for each of the time intervals: (i) subdividing the time interval into time subintervals; (ii) for each of the time subintervals, determining a fine bounding geometry for the actor; and (iii) determining a distance interval that corresponds to the time interval determine a maximum distance interval length to guarantee a detection range with respect to a reference point on the reference curve. Determining the distance interval may use the algorithm $\delta_{detect} = p - r_{turn}$, which will be described in more detail below.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

This document describes a method by which a motion planning system of an autonomous vehicle (AV) may determine a trajectory for the AV by determining the occupied and free configuration space of the AV in curvilinear coordinates. The "configuration space" of a robotic device is the space of possible positions that the device may obtain over time. In Cartesian coordinates, position includes both location and orientation, and therefore may be considered to be the possible {x, y, yaw} poses that the vehicle may attain over time. However, in curvilinear coordinates the configuration space considers the possible {longitudinal, lateral} positions that the vehicle may attain with respect to a reference curve over time. The systems of this document use curvilinear coordinates to compute the configuration space. Portions of the configuration space at which the AV would contact another object are "occupied," while portions that are free of such contact are "free." The AV's motion planning system may then compute a trajectory in the free configuration space—and avoid placing the trajectory in the occupied configuration space—to avoid conflict with other objects.

Figure 1:
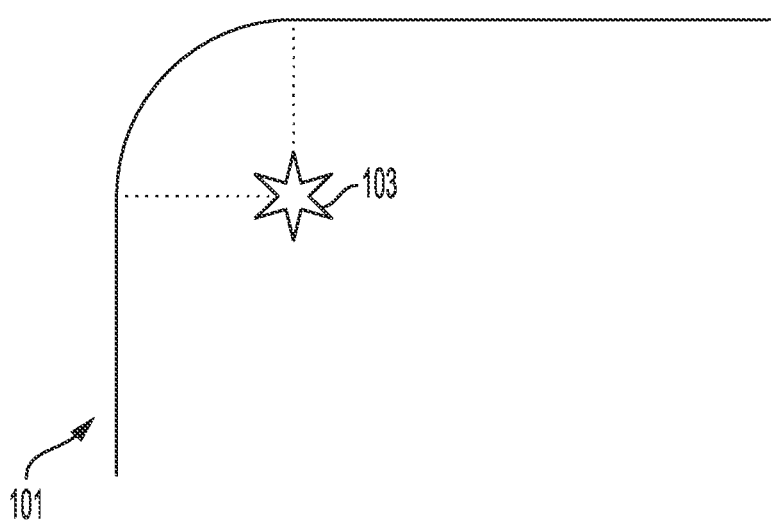
FIG. 1 illustrates an example of a reference curve in Cartesian coordinates.
Figure 2:
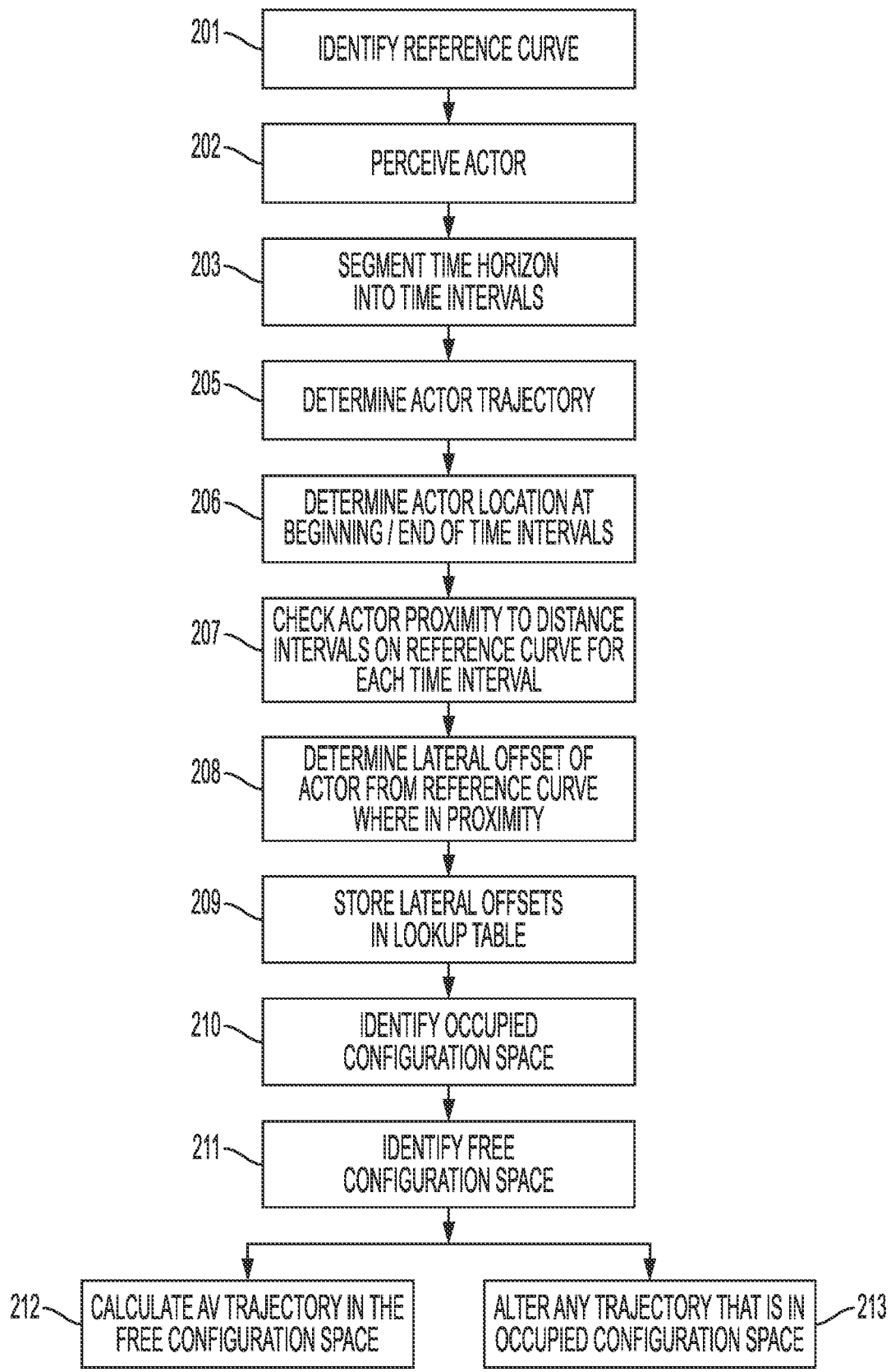
FIG. 2 is a flowchart illustrating a process of determining a trajectory of an autonomous vehicle using a configuration space calculation in curvilinear coordinates.

FIG. 2 illustrates an example process by which an AV's motion planning system may do this. At 201 the system may identify a reference curve that represents a path via which the AV may travel in an environment over a time horizon. The system may identify as the reference curve, for example, the centerline of a lane in which the AV is traveling and/or will travel, or a curve that transitions between the centerlines of multiple lanes in which the AV is traveling and/or will travel. The system may identify the center as a midpoint between lane markings as detected in perception data, and/or as stored in a map of the location in which the AV is present.

FIG. 2 illustrates an example process by which an AV's motion planning system may do this. At 201 the system may identify a reference curve that represents a path via which the AV may travel in an environment over a time horizon. The system may identify as the reference curve, for example, the centerline of a lane in which the AV is traveling and/or will travel, or a curve that transitions between the centerlines of multiple lanes in which the AV is traveling and/or will travel. The system may identify the center as a midpoint between lane markings as detected in perception data, and/or as stored in a map of the location in which the AV is present. At 202 the system will receive, from a perception system of the autonomous vehicle, data representative of an actor that is moving in the environment.

Methods by which the system may do this are described below. The actor may be another vehicle (such as a car, truck, bicycle or bus), a pedestrian, an animal or any other actor that is detected and moving.

At 203 the system will divide the period of interest in the time horizon (in which the period of interest may include all or a portion of the time horizon) into discrete time intervals, and it will divide the region of interest on the reference curve (in which the region of interest may include all or a portion of the reference curve) into discrete distance intervals. To do this, the system may identify a set of discrete points along the reference curve, and then determine each distance interval as an interval between two adjacent points.

Figure 3:
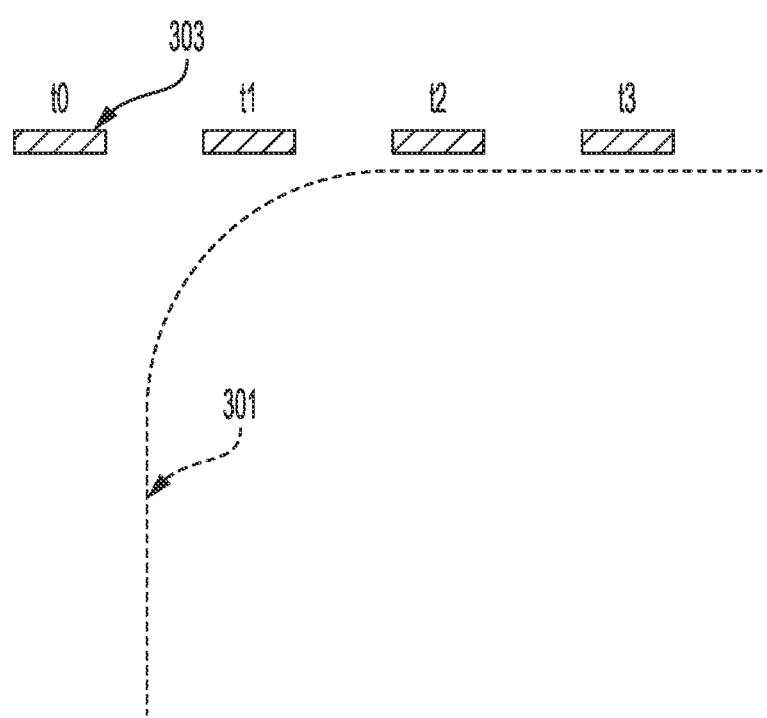
FIG. 3 illustrates an example of how an autonomous vehicle's on-board computing system may predict movement of a moving actor with respect to a reference curve over time.

At 205, the AV's motion planning system will receive a predicted trajectory for the actor (as determined by the AV's prediction system), and at 206 the motion planning system will then determine an expected location of the actor at the start and end of each time interval. For example, FIG. 3 shows the relative location of the actor (represented as a convex hull 303) with respect to the reference curve 301 at times t0, t1, t2 and t3.

Returning to FIG. 2, at 207 the system will perform a proximity check for the actor for each time interval, which means that the system will determine which distance intervals along the reference curve to which that the actor is in proximity for the time interval. The system will consider the actor to be in proximity to the reference curve if the actor is sufficiently near the reference curve to be of relevance to trajectory planning, meaning the AV may take braking or steering action in response to the actor's position. Relevance may be determined as a simple threshold distance from the reference curve, or by a function of other characteristics of the actor. An example method by which the system may do this will be described below.

Figure 4A:
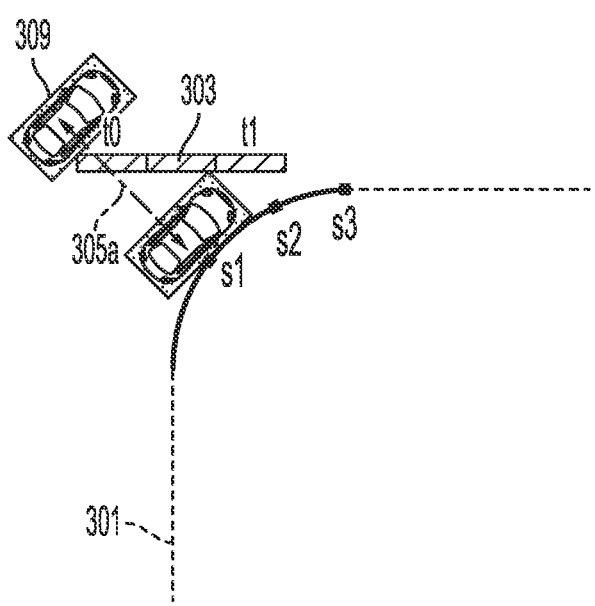
FIGS. 4A-4F illustrate how lateral offset is calculated to a moving actor for multiple sample locations on a reference curve over a sequence of time intervals.
Figure 4B:
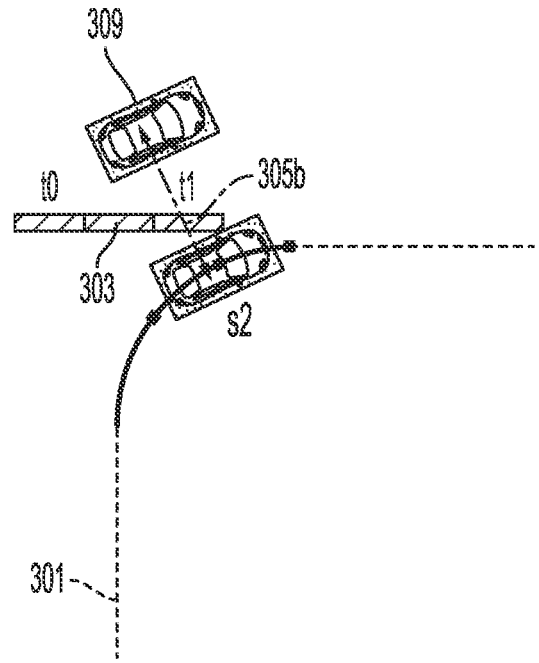
Figure 4C:
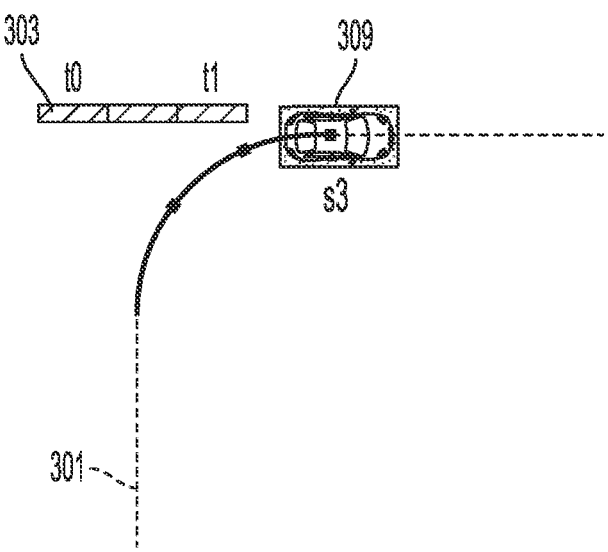

At 208, the system will calculate the lateral offsets to the actor at each sample point within each distance interval that is in proximity for the time interval. This is illustrated in FIGS. 4A-D. For each time interval, the system will compute a convex hull 303 surrounding the actor at the expected location at the start and end of the time interval. FIGS. 4A and 4B show that during time interval [t0, t1], lateral offsets 305a, 305b from sample locations s1 and s2 to a reference point on a bounding box 309 of the AV (where the location of the lateral offset AV bounding box 309 touches convex hull 303 of the actor) may be calculated from sampling points s1 and s2, respectively. In FIG. 4C the actor (represented as convex hull 303) is not lateral to the reference curve at sample location s3 during time interval [t0, t1], so no offset is calculated from reference point s3 for that time interval.

Figure 4D:
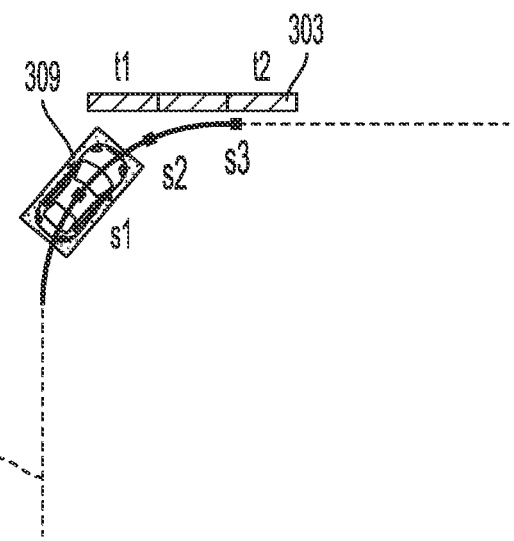
Figures 4E, 4F:
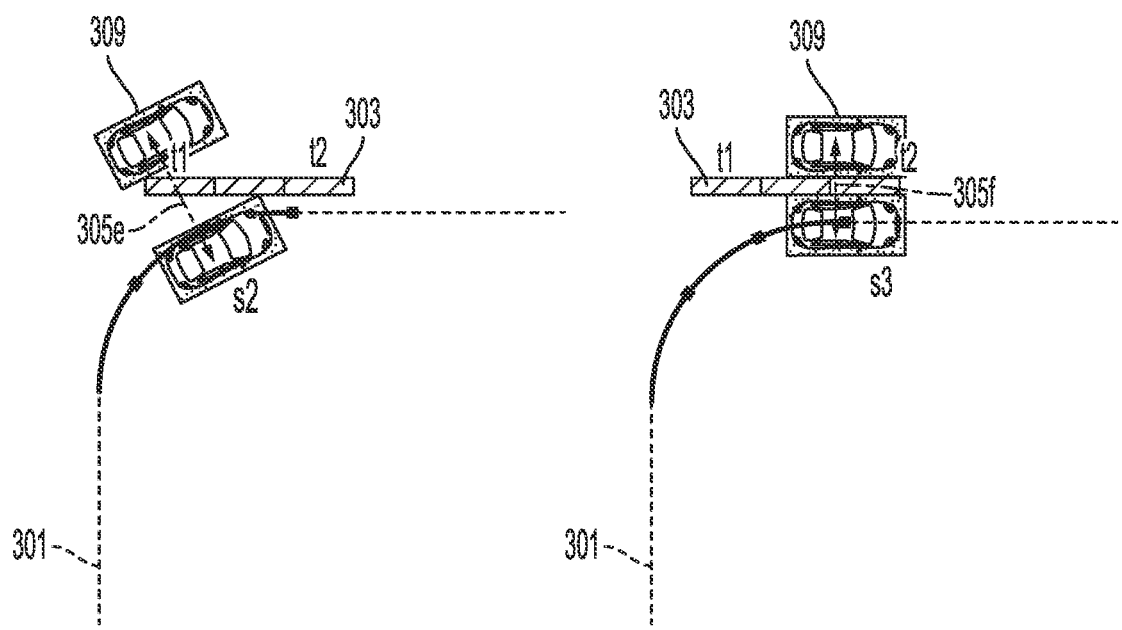

FIGS. 4D-4F show calculations during time interval [t1, t2]. As with FIG. 4C and the first time interval, FIG. 4D shows that during time interval [t1, t2] actor 303 is not lateral from sample location s1, so no offset is calculated from s1 for that time interval. However, as illustrated in FIGS. 4E and 4F, during time interval [t1, t2], lateral offsets 305e, 305f may be calculated from sampling points s2 and s3. Thus, the system may only calculate lateral offset distances when the actor is actually in proximity to the reference curve. This helps optimize computational resource allocation during runtime, and it also helps the system select discrete interaction intervals and reason about them separately.

The lateral offset calculated at 208 may be a distance from the curve that the AV's bounding box 309 must travel to contact the edge of the convex hull for the actor 303 as shown in FIGS. 4A-4F, or another distance measurement as determined by the system's offset calculation rules. The system may determine lateral offset distances using multiple such algorithms, and it may save the distances to a lookup table. For example, the lookup table may include lateral distances from the reference curve to each side of the object, at each location along the reference curve, for each time interval. Saving the distances to a lookup table enables the system to consolidate distance calculations for efficiency of motion planning calculation. Optionally, once a distance table is determined, it may be used so long as the maximum deviation between the AV's candidate trajectory and the reference curve is below a specified threshold. If the deviation is greater than the threshold, then the reliability of the table with respect to that trajectory may be questionable, and the system will recalculate a new lookup table with respect to a new reference curve based on the AV's candidate trajectory, by re-doing the calculations described in this document and in the figures. Optionally, the system may only perform the recalculation over a time period of interest, or region of interest on the reference curve.

When performing the proximity check at 207, the system may initially use a relatively coarse bounding geometry to define the space occupied by the AV and actor. The coarse bounding geometry will include all of the AV or actor, and it also may include a relatively larger amount of space around the AV or actor. However, for any time interval in which the proximity check determines that the coarse bounding geometries of the AV and actor intersect, the system may determine one or more finer bounding geometries that more precisely define the region of interest to include relatively less extra space around the AV or actor. This coarse-to-fine localization, and bounding geometry determination at each step, will be described in more detail below.

Figure 5:
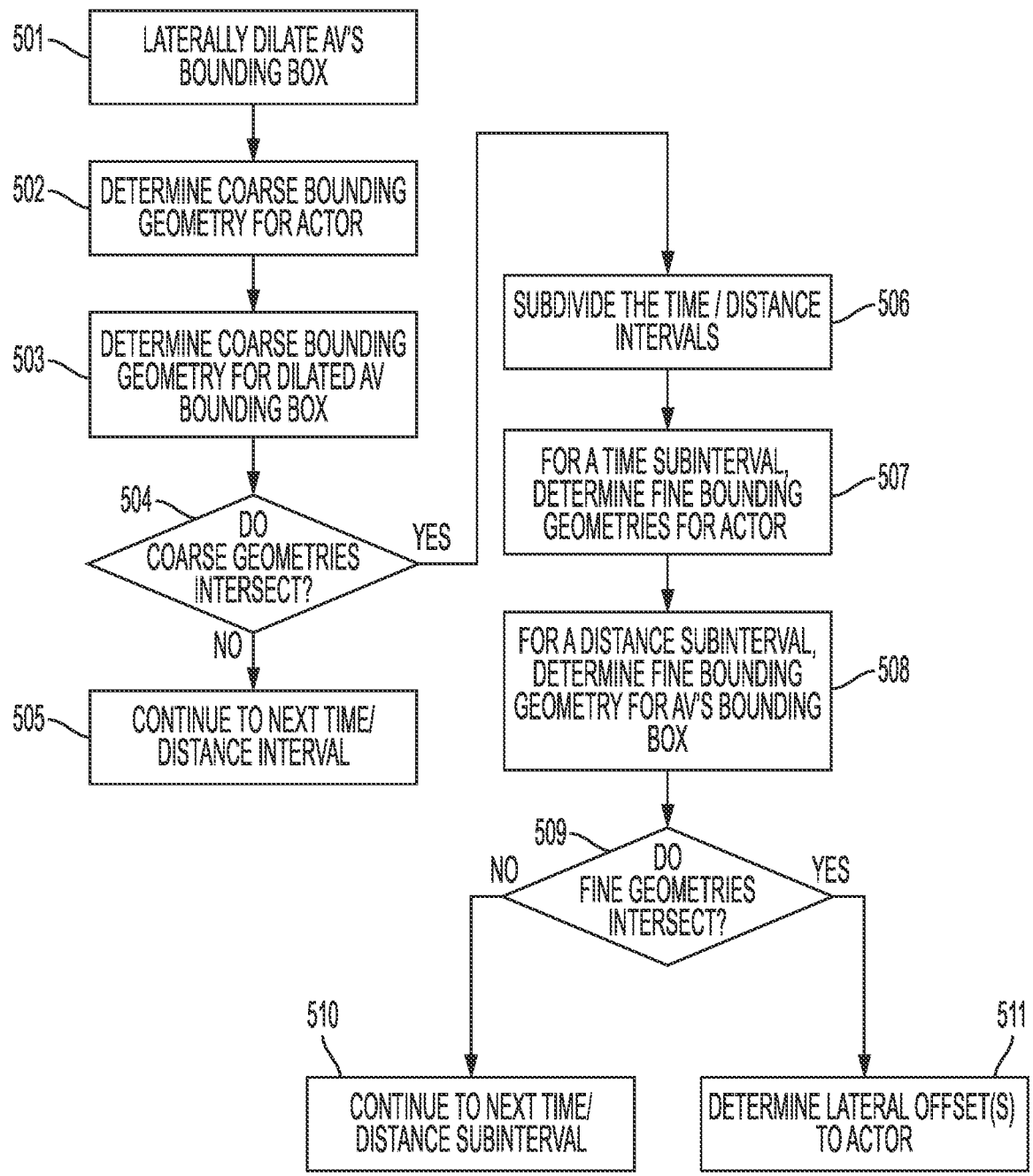
FIG. 5 illustrates an example coarse-to-fine proximity checking process.
Figure 6A:
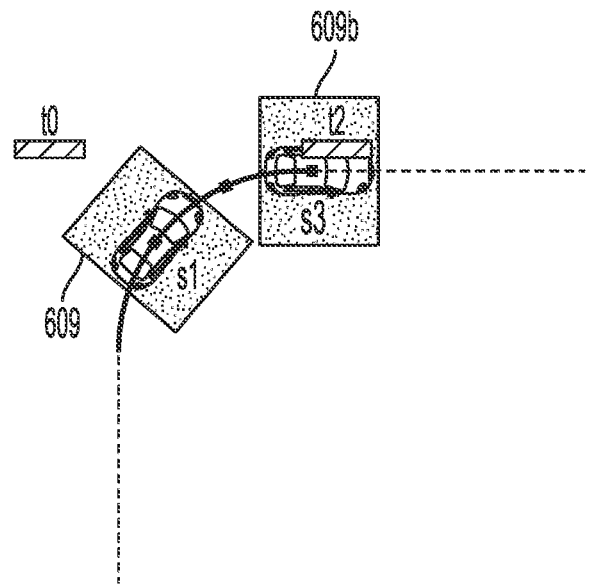
FIGS. 6A and 6B illustrate example coarse bounding geometries for a moving actor.
Figure 6B:
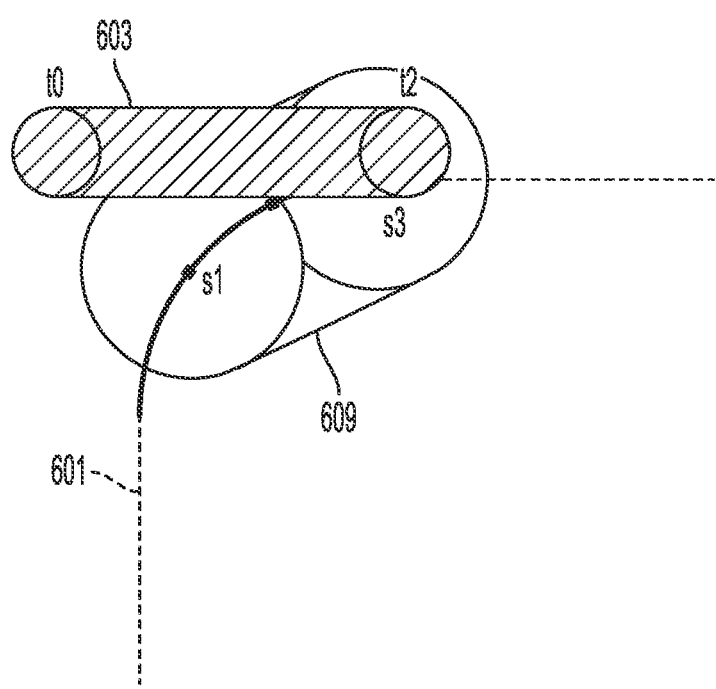

Before calculating lateral offsets to the actor as illustrated in FIGS. 4A-4D, the system may use a proximity checking algorithm to determine the distance intervals along the reference curve at which the actor is in proximity for each time interval. Any suitable proximity checking algorithm may be used. FIG. 5 illustrates an example hierarchical, coarse-to-fine proximity checking process. At the outset, at 501 the system will laterally dilate the AV's bounding box by the desired threshold on a lateral distance from the reference curve to consider an actor in proximity. Actors within this threshold on lateral distance from the reference curve are sufficiently near the reference curve to be of relevance to trajectory planning, meaning the AV may take braking or steering action in response to the actor's position. The lateral distance threshold may be based on the width of the lane or drivable area through which the reference curve passes. FIG. 6A illustrates an example, in which dilated bounding boxes 609a, 609b for the AV are shown at sampling points s1 and s3 respectively on the reference curve 601. After that, the process starts by determining a coarse bounding box for the moving actor for a time interval at 502. A suitable coarse geometry may be a "stadium" or "capsule" geometry, constructed from bounding circles around the bounding box of the actor at the start and end of the timer interval. The "stadium" encompasses all possible locations through which the actor may travel over the entire time interval. An example is shown in FIG. 6B, which illustrates a bounding stadium 603 for the moving actor over time interval [t0, t2].

Returning to FIG. 5, at 503, for the distance interval on the reference curve that includes the AV's bounding box, the system will determine a course bounding geometry for the AV's bounding box. An example is shown in FIG. 6B, which illustrates a bounding stadium 609 for the dilated AV bounding box over the distance interval between [s1, s3] along the reference curve 601. At 504, the system will determine whether the coarse bounding geometries for the moving actor and AV intersect. If the coarse bounding geometries of the moving actor and AV do not intersect (504: NO), then the proximity checking may continue to the next distance interval along the reference curve, or the next time interval (step 505).

On the other hand, if the coarse bounding geometries of the moving actor and the AV do intersect (504: YES) then at 506 the system may segment the wide time and distance intervals into multiple smaller subintervals. The system may then determine relatively finer bounding geometries for the actor at 507 over each of the time subintervals, and for the AV at 508 over each of the distance subintervals. A suitable fine geometry may be an "oriented bounding box."

Figure 7A:
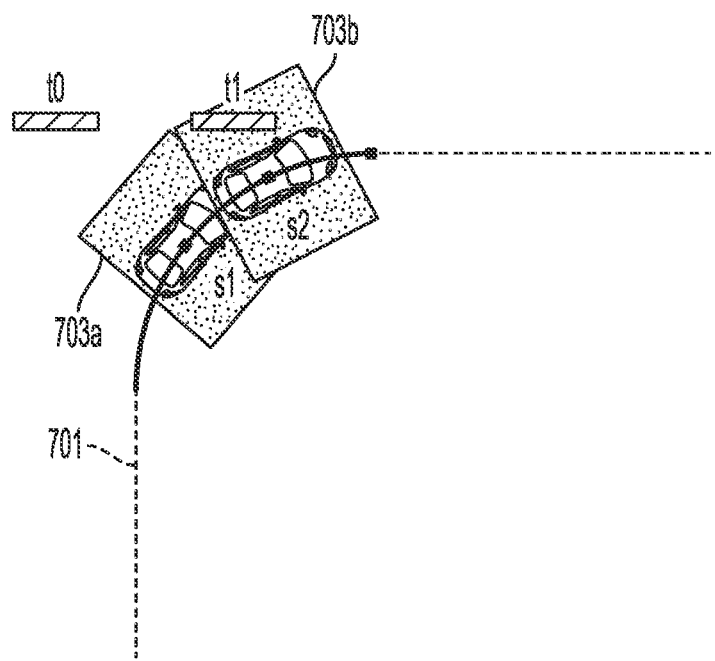
FIGS. 7A and 7B illustrate example fine bounding geometries for an autonomous vehicle.
Figure 7B:
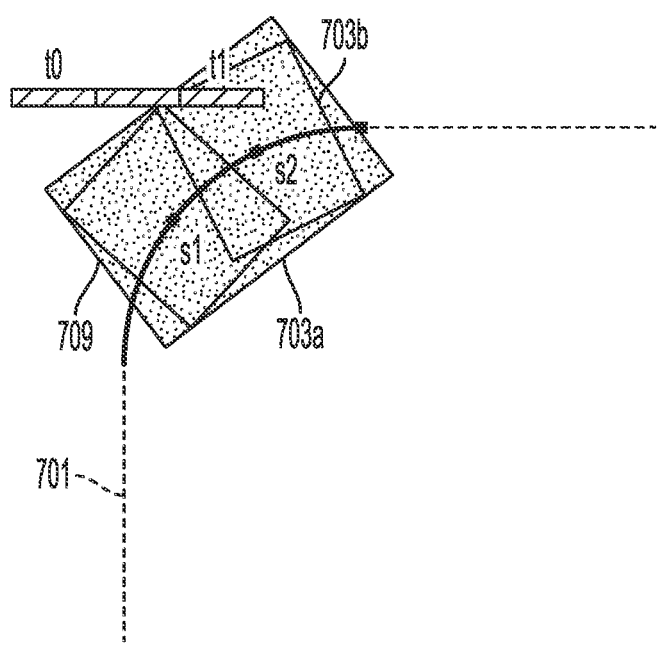

At 509 the system will then determine, for each subinterval, whether the fine bounding geometries of the moving actor and AV intersect. If the fine bounding geometries of the moving actor and AV do not intersect (509: NO), then the proximity checking may continue to the next distance subinterval along the reference curve, or the next time subinterval (step 510). If the fine bounding geometries intersect (509: YES), at 511 the system will then determine, at each location within the distance subinterval, the lateral offset distance from the reference curve to the convex hull of the moving actor over the time subinterval. An example result of this process is shown in FIG. 7A, in which dilated AV bounding boxes 703a, 703b are shown along reference curve 701 at sampling points s1 and s2 respectively. FIG. 7B illustrates the fine bounding geometry 709 for the AV over the distance interval between sampling points [s1, s2] on the reference curve. Other proximity checking algorithms may be applied, such as other hierarchical intersection checking methods, or spatial index methods such as R-trees.

In some embodiment, when discretizing the time horizon into time intervals (or even when calculating the initial time intervals at the start of the process), the system may take precautions to avoid overlooking the actor's location at a critical point in time. For example, if the moving actor is heading in a direction that will cross the reference curve, it's possible that the actor would be on one side of the curve at time t0 and the other side of the curve at t1. These two sampling times would not capture the time when the actor actually crosses the reference curve. To address this, the system may require a minimum number of sample times. The system may also calculate the convex hull of the actor's bounding box between sample times. In the example above, the convex hull of the actor's bounding box at t0 and t1 would intersect the reference curve even if the individual bounding boxes at t0 and t1 do not.

Figure 8:
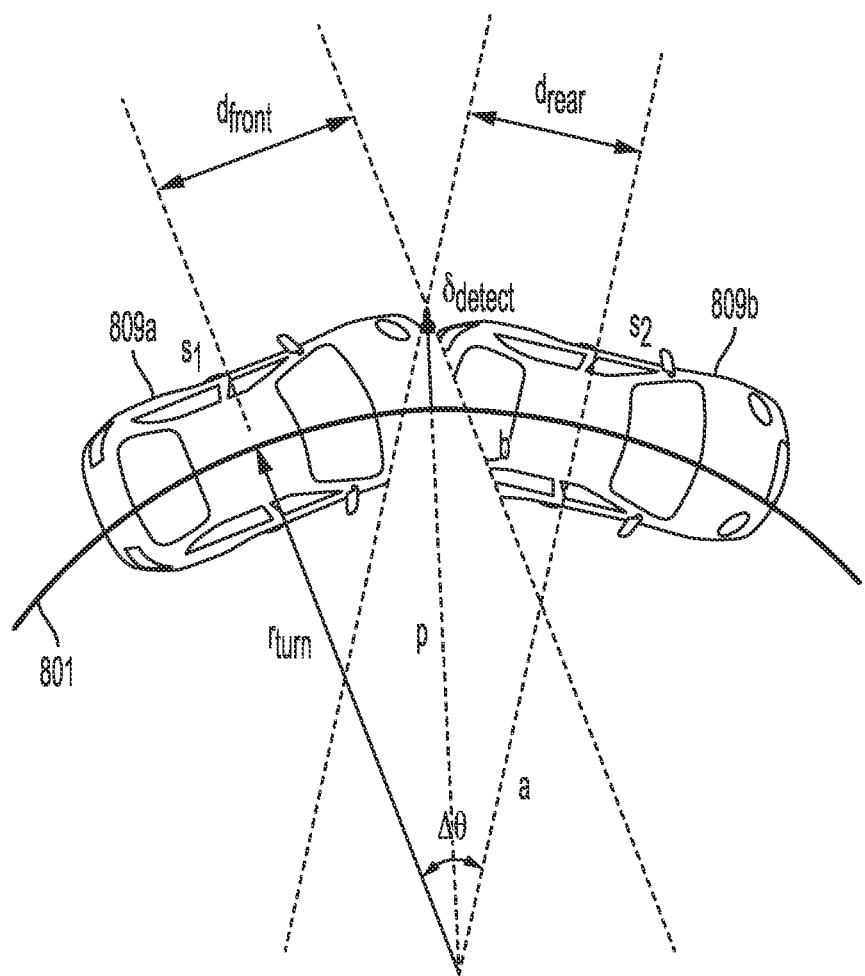
FIG. 8 illustrates an example geometry that may be used to calculate a guaranteed detection sampling range for a moving actor.

In some embodiments, when discretizing the reference curve into distance intervals, the system may determine a maximum distance interval length to guarantee a detection range with respect to the reference curve. This can be understood with reference to FIG. 8, in which the reference curve 801 is depicted with bounding boxes for the AV 809a, 809b at each of sampling points s1 and s2, respectively. A suitable algorithm may consider $\delta_{detect}$ to be the guaranteed detection range (that is, the distance range from the reference curve in which any object is guaranteed to be detected). For a given pair of location samples s1 and s2 along reference curve 801, the guaranteed detection range $\delta_{detect} = p - r_{turn}$, in which:

p is the diagonal of a parallelogram $p = \sqrt{a^2 + ab^2 + 2abcos(\Delta\theta)}$ where a and b are sides of the parallelogram:

$$a = d_{front}/\sin(\Delta\theta)$$

$$b = d_{rear}/\sin(\Delta\theta)$$

Where $d_{front}$ and $d_{rear}$ are distances from the reference point to front and rear of the AV, respectively.

$r_{turn}$ is the turn radius of the reference curve, calculated as $r_{turn} = \Delta s/\Delta\theta$.

If the change in heading $\Delta\theta$ is zero, then the guaranteed detection range=0 if $\Delta s > d_{front} + d_{rear}$, otherwise the detection range is infinite.

Returning to FIG. 2, once the lateral offset of the actor from the reference curve is determined, the system may use that information to identify occupied regions of the AV's configuration space (210). As previously noted, at 208 for each time interval, and for each sample point along the reference curve, the system may determine a lateral offset that is occupied by the actor. At 209, the system may store these calculations in a lookup table. The system may then later extract the lateral offsets from the lookup table and use them to identify the occupied regions of the AV's configuration space at 210 as described above.

At 211 the system may identify the remaining (non-occupied configuration space as free configuration space 211 for use in its motion planning. Specifically, at 212 the motion planning system may calculate a trajectory that avoids any intersection with the occupied configuration space and that only includes free configuration space. Alternatively, if a trajectory is already calculated and the trajectory will traverse (i.e., intersect) the occupied configuration space, then at 213 the system may alter that trajectory by changing the conflicting portion and/or by calculating or selecting a new trajectory. The change or alteration may result in the AV: (a) slowing before it reaches the occupied configuration space and thus allowing the moving actor to pass; (b) accelerating to pass through the occupied configuration space in a time interval before the space will become occupied; or (c) moving to another lane or otherwise changing a direction to avoid the occupied configuration space.

Figure 9:
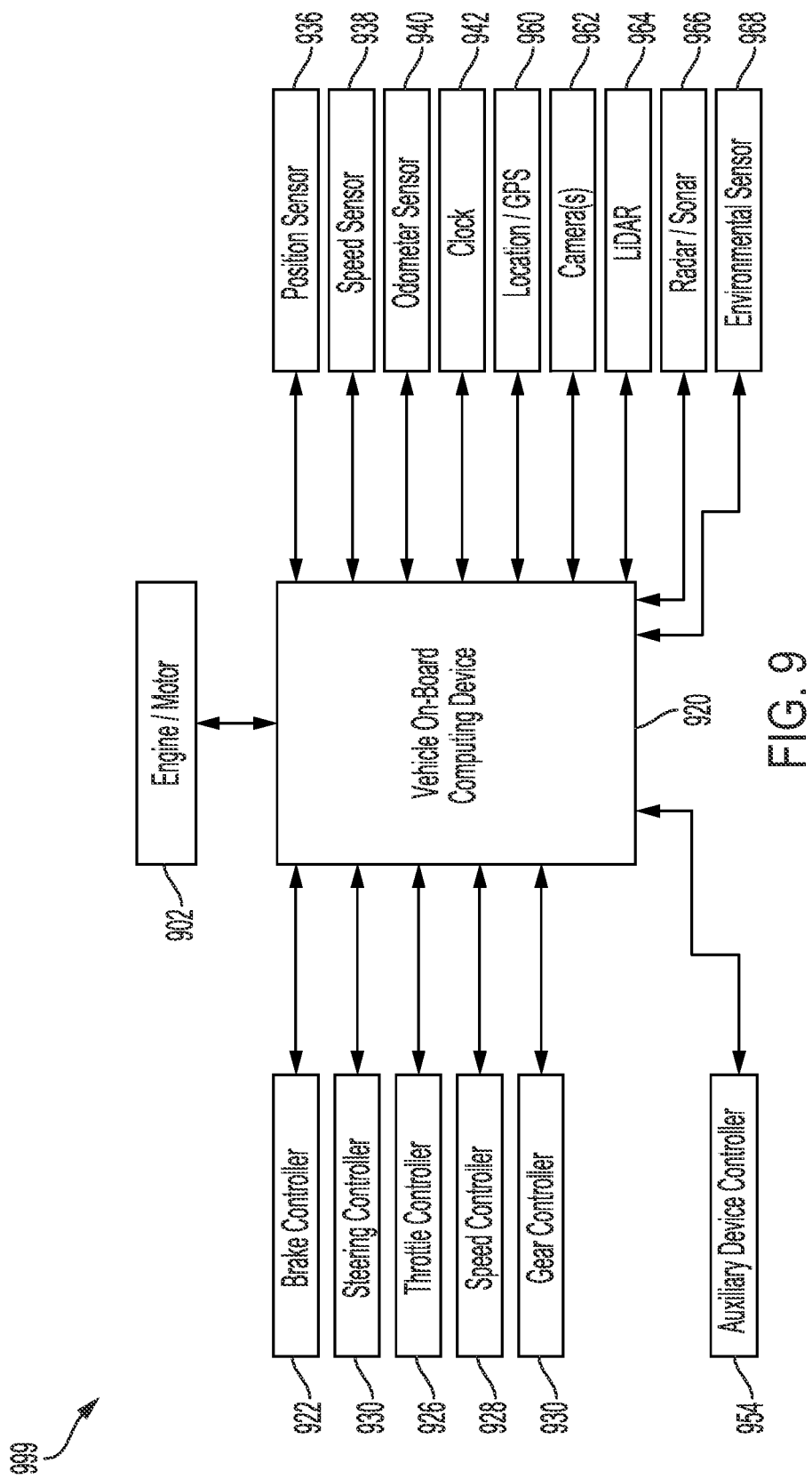
FIG. 9 illustrates example systems and components of an autonomous vehicle.

FIG. 9 illustrates an example system architecture 999 for a vehicle, such as an AV. The vehicle includes an engine or motor 902 and various sensors for measuring various parameters of the vehicle and/or its environment. Operational parameter sensors that are common to both types of vehicles include, for example: a position sensor 936 such as an accelerometer, gyroscope and/or inertial measurement unit; a speed sensor 938; and an odometer sensor 940. The vehicle also may have a clock 942 that the system uses to determine vehicle time during operation. The clock 942 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 960 such as a global positioning system (GPS) device; object detection sensors such as one or more cameras 962; a LiDAR sensor system 964; and/or a radar and or and/or a sonar system 966. The sensors also may include environmental sensors 968 such as a precipitation sensor and/or ambient temperature sensor. The object detection sensors may enable the vehicle to detect moving actors and stationary objects that are within a given distance range of the vehicle 999 in any direction, while the environmental sensors collect data about environmental conditions within the vehicle's area of travel. The system will also include one or more cameras 962 for capturing images of the environment. Any or all of these sensors, together with one or more processors of the vehicle's on-board computing device 920 and programming instructions that, when executed by the processors, enable the computing system to classify objects in the perception data, may be considered to be the vehicle's perception system.

During deployment of the vehicle, the vehicle will receive perception data from one or more sensors of the vehicle's perception system. The perception data may include data representative of one or more objects in the environment. The perception system will process the data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in Yurtsever et al., "A Survey of Autonomous Driving: Common Practices and Emerging Technologies" (arXiv Apr. 2, 2020).

During a run of the vehicle, information is communicated from the sensors to an on-board computing device 920. The on-board computing device 920 analyzes the data captured by the perception system sensors and, acting as a motion planning system, executes instructions to determine a trajectory for the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016). The trajectory will include pose and time parameters, and the vehicle's on-board computing device will control operations of various vehicle components to move the vehicle along the trajectory. For example, the on-board computing device 920 may control braking via a brake controller 922; direction via a steering controller 924; speed and acceleration via a throttle controller 926 (in a gas-powered vehicle) or a motor speed controller 928 (such as a current level controller in an electric vehicle); a differential gear controller 930 (in vehicles with transmissions); and/or other controllers 954.

Geographic location information may be communicated from the location sensor 960 to the on-board computing device 920, which may then access a map of the environment that corresponds to the location information to determine known fixed features of the environment such as streets, buildings, stop signs and/or stop/go signals. Captured images from the cameras 962 and/or object detection information captured from sensors such as a LiDAR system 964 is communicated from those sensors) to the on-board computing device 920. The object detection information and/or captured images may be processed by the on-board computing device 920 to detect objects in proximity to the vehicle 999. In addition or alternatively, the AV may transmit any of the data to an external server for processing. Any known or to be known technique for making an object detection based on sensor data and/or captured images can be used in the embodiments disclosed in this document.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network. The processor of any such device may perform the operations that discussed above.

Figure 10:
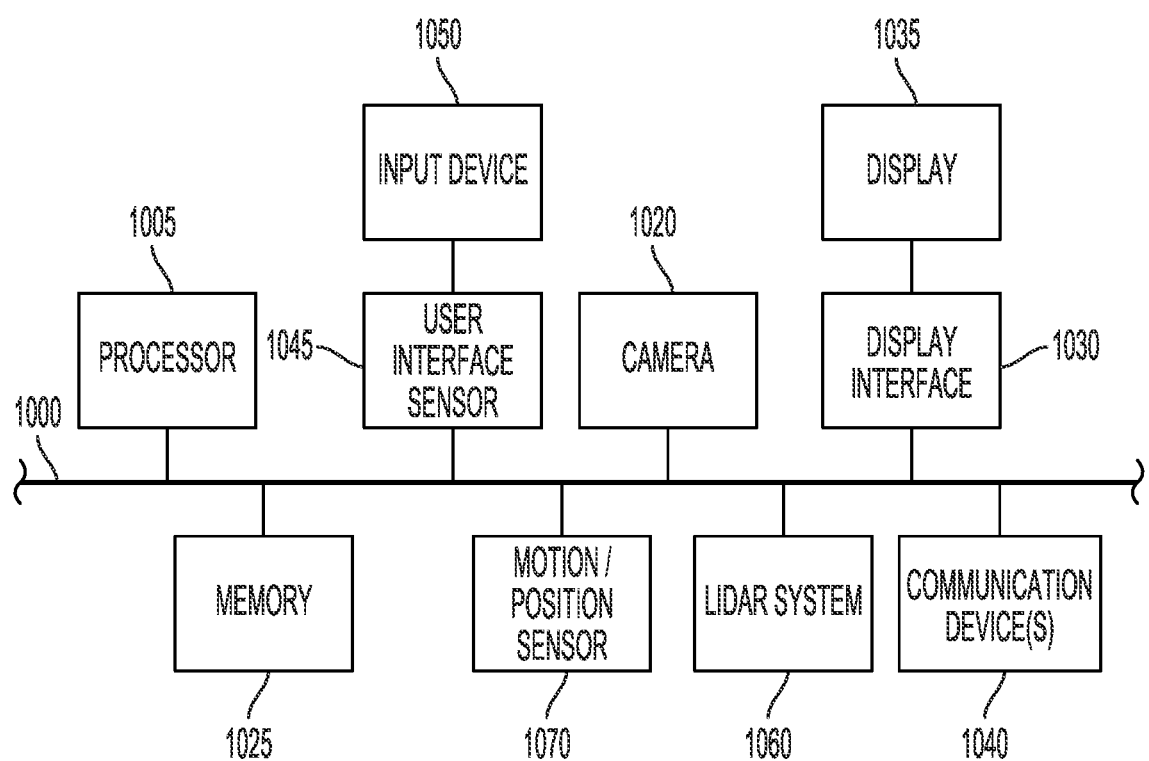
FIG. 10 is a block diagram that illustrates various elements of a possible electronic subsystem of an AV and/or external electronic device.

FIG. 10 depicts an example of internal hardware that may be included in any of the electronic components of the system, such as internal processing systems of the AV, external monitoring and reporting systems, or remote servers. An electrical bus 1000 serves as an information highway interconnecting the other illustrated components of the hardware. Processor 1005 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1025. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 1030 may permit information from the bus 1000 to be displayed on a display device 1035 in visual, graphic or alphanumeric format, such on an in-dashboard display system of the vehicle. An audio interface and audio output (such as a speaker) also may be provided. Communication with external devices may occur using various communication devices 1040 such as a wireless antenna, a radio frequency identification (RFID) tag and/or short-range or near-field communication transceiver, each of which may optionally communicatively connect with other components of the device via one or more communication system. The communication device(s) 1040 may be configured to be communicatively connected to a communications network, such as the Internet, a local area network or a cellular telephone data network.

The hardware may also include a user interface sensor 1045 that allows for receipt of data from input devices 1050 such as a keyboard or keypad, a joystick, a touchscreen, a touch pad, a remote control, a pointing device and/or microphone. Digital image frames also may be received from a camera 1020 that can capture video and/or still images. The system also may receive data from a motion and/or position sensor 1070 such as an accelerometer, gyroscope or inertial measurement unit. The system also may receive data from a LiDAR system 1060 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without, limitation, operating wheels or propellers to effectuate driving, flying or other transportation actions, operating robotic lifts for loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

A "run" of a vehicle refers to an act of operating a vehicle and causing the vehicle to move about the real world. A run may occur in public, uncontrolled environments such as city or suburban streets, highways, or open roads. A run may also occur in a controlled environment such as a test track.

The term "object," when referring to an object that is detected by a vehicle perception system or simulated by a simulation system, is intended to encompass both stationary objects and moving (or potentially moving) actors, except where specifically stated otherwise by terms use of the term "actor" or "stationary object."

The term "bounding box" refers to a rectangular box that represents the location of an object. A bounding box may be represented in data by x- and y-axis coordinates [$x_{max}$, $y_{max}$] that correspond to a first corner of the box (such as the upper right corner), along with x- and y-axis coordinates [$x_{min}$, $y_{min}$] that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera, or points of a point cloud captured by a LiDAR sensor. A "bounding geometry" is a shape that provides the function of a bounding box above, but which does not necessarily have a rectangular shape. Example bounding geometries include circles, cylinders, triangles, rectangles and other shapes.

In this document, the terms "street," "lane," and "road" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a lane may be a corridor of the warehouse, or a street may be the corridor and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, when relative terms of order such as "first" and "second" are used to modify a noun, such use is simply intended to distinguish one item from another, and is not intended to require a sequential order unless specifically stated.

The invention claimed is:

1. A method of planning a trajectory for an autonomous vehicle, the method comprising:
   by a motion planning system of an autonomous vehicle:
   determining a reference curve that represents a path via which the autonomous vehicle may travel in an environment over a time horizon;
   receiving, from a perception system of the autonomous vehicle, data representative of an actor that is moving in the environment;
   segmenting the time horizon into a plurality of time intervals;
   for each of the time intervals:

defining a coarse bounding geometry for the actor over the time interval, wherein the coarse bounding geometry encompasses the actor and includes possible position of the actor during the time interval, defining a coarse bounding geometry for the autonomous vehicle over the time interval, wherein the coarse bounding geometry encompasses the autonomous vehicle, determining whether the coarse bounding geometry for the actor will intersect with the coarse bounding geometry of the autonomous vehicle over a distance interval on the reference curve, subdividing the time interval into time subintervals in response to the coarse bounding geometry for the actor intersecting the coarse bounding geometry of the autonomous vehicle, determining a plurality of fine bounding geometries for the actor over the time subintervals and a plurality of fine bounding geometries for the autonomous vehicle over distance subintervals, and predicting a lateral offset distance between the reference curve and the actor based on the plurality of fine bounding geometries of the actor and the plurality of fine bounding geometries for the autonomous vehicle; and using the predicted lateral offset distances to determine a trajectory for the autonomous vehicle.

2. The method of claim 1 further comprising, by the motion planning system:

storing the predicted lateral offset distances in a lookup table, wherein using the predicted lateral offset distances to determine a trajectory for the autonomous vehicle comprises retrieving the predicted lateral offset distances from the lookup table when the moving actor is in proximity to the autonomous vehicle.

3. The method of claim 1, wherein:

using the predicted lateral offset distance to determine a trajectory for the autonomous vehicle comprises determining, from the predicted lateral offset distance, one or more regions of configuration space for the autonomous vehicle that are occupied by the actor, and one or more regions of configuration space for the autonomous vehicle that are free of the actor;

the method further comprises determining whether a planned trajectory for the autonomous vehicle will conflict with any of the occupied regions of a configuration space; and the method further comprises, when the planned trajectory for the autonomous vehicle will conflict with any of the occupied regions of the configuration space, altering the planned trajectory to be fully within a free configuration space for the autonomous vehicle and outside of an occupied configuration space for the autonomous vehicle.

4. The method of claim 1, wherein using the predicted lateral offset distance to determine a trajectory for the autonomous vehicle comprises:

determining one or more regions of configuration space for the autonomous vehicle that are occupied and one or more regions of configuration space for the autonomous vehicle that are free; and determining a planned trajectory that is fully within a region of free configuration space for the autonomous vehicle and outside of all regions of occupied configuration space for the autonomous vehicle.

5. The method of claim 1, wherein predicting the lateral offset distances further comprises determining lateral offset distances in each location where the fine bounding geometries of the actor and the autonomous vehicle intersect.

6. The method of claim 1, further comprising:

for each of the time subintervals, determining a fine bounding geometry for the actor to obtain the plurality of fine bounding geometries for the actor;

determining a distance interval that corresponds to the time interval, and subdividing the distance interval on the reference curve into a plurality of distance subintervals;

for each of the distance subintervals, determining a fine bounding geometry for the autonomous vehicle; and identifying a plurality of pairs of the time intervals and corresponding distance subintervals and, for each time subinterval and distance subinterval pair:

determining whether the fine bounding geometry for the actor intersects with the fine bounding geometry for the autonomous vehicle, if the fine bounding geometry for the actor does not intersect with the fine bounding geometry for the autonomous vehicle, continuing to a next time subinterval, and if the fine bounding geometry for the actor intersects with the fine bounding geometry for the autonomous vehicle, predicting the lateral offset to a bounding geometry of the actor over the time subinterval at sample locations on the reference curve within the distance subinterval.

7. The method of claim 1, wherein determining the coarse bounding geometry for the autonomous vehicle further includes:

determining a bounding box for the autonomous vehicle; and dilating the bounding box for the autonomous vehicle laterally by a threshold.

8. The method of claim 7, wherein predicting the lateral offset distance between the autonomous vehicle and the moving actor comprises determining a distance between a bounding box for the autonomous vehicle and a convex hull of the actor.

9. The method of claim 1, further comprises:

determining a maximum distance interval length to guarantee a detection range with respect to a reference point on the reference curve determining the distance interval $\delta_{detect} = p - r_{turn}$, in which:

p is the diagonal of a parallelogram $p = \sqrt{a^2 + ab^2 + 2abcos(\Delta\theta)}$, where a and b are sides of the parallelogram:

$$a = d_{front}/\sin(\Delta\theta)$$

$$b = d_{rear}/\sin(\Delta\theta)$$

$d_{front}$ and $d_{rear}$ are distances from the reference point to front and rear of the autonomous vehicle, respectively, and $r_{turn}$ is the turn radius of the reference curve, calculated as $r_{turn} = \Delta s/\Delta\theta$;

for each of the distance subintervals, determining a fine bounding geometry for the autonomous vehicle; and determining whether the fine bounding geometry for the actor intersects with the fine bounding geometry for the autonomous vehicle in any time subinterval and distance subinterval pair.

10. An autonomous vehicle, comprising:
a perception system comprising one or more sensors; and
a computing device comprising a processor and memory containing programming instructions that are configured to cause the computing device to act as a motion planning system by:
  determining a reference curve that represents a path via which the autonomous vehicle may travel in an environment over a time horizon,
  receiving, from the perception system, data representative of an actor that is moving in the environment,
  segmenting the time horizon into a plurality of time intervals, and
  for each of the time intervals:
    define a coarse bounding geometry for the actor over the time interval, wherein the coarse bounding geometry encompasses the actor and includes possible position of the actor during the time interval,
    define a coarse bounding geometry for the autonomous vehicle over the time interval, wherein the coarse bounding geometry encompasses the autonomous vehicle,
    determine whether the coarse bounding geometry for the actor will intersect with the coarse bounding geometry of the autonomous vehicle over a distance interval on the reference curve,
    subdivide the time interval into time subintervals in response to the coarse bounding geometry for the actor intersecting the coarse bounding geometry of the autonomous vehicle,
    determine a plurality of fine bounding geometries for the actor over the time subintervals and a plurality of fine bounding geometries for the autonomous vehicle over distance subintervals, and
    predict a lateral offset distance between the reference curve and the actor based on the plurality of fine bounding geometries of the actor and the plurality of fine bounding geometries of the autonomous vehicle; and
  use the predicted lateral offset distances to determine a trajectory for the autonomous vehicle.

11. The autonomous vehicle of claim 10 further comprising additional instructions that are configured to cause the motion planning system to store the predicted lateral offset distances in a lookup table,
wherein the instructions to use the predicted lateral offset distances to determine a trajectory for the autonomous vehicle comprise instructions to retrieve the predicted lateral offset distances from the lookup table when the moving actor is in proximity to the autonomous vehicle.

12. The autonomous vehicle of claim 10, wherein:
the instructions to use the predicted lateral offset distance to determine a trajectory for the autonomous vehicle comprise instructions to determine, from the predicted lateral offset distance, one or more regions of configuration space for the autonomous vehicle that are occupied by the actor, and one or more regions of configuration space for the autonomous vehicle that are free of the actor; and
the memory also comprises instructions to:
  determine whether a planned trajectory for the autonomous vehicle will conflict with any of the occupied regions of a configuration space, and
  when the planned trajectory for the autonomous vehicle will conflict with any of the occupied regions of the configuration space, alter the planned trajectory to be fully within a free configuration space for the autonomous vehicle and outside of an occupied configuration space for the autonomous vehicle.

13. The autonomous vehicle of claim 10, wherein the instructions to use the predicted lateral offset distance to determine a trajectory for the autonomous vehicle comprise instructions to:
  determine one or more regions of configuration space for the autonomous vehicle that are occupied and one or more regions of configuration space for the autonomous vehicle that are free; and
  determine a planned trajectory that is fully within a region of free configuration space for the autonomous vehicle and outside of all regions of occupied configuration space for the autonomous vehicle.

14. The autonomous vehicle of claim 10, wherein the instructions to predict the lateral offset distances further comprises
  determine lateral offset distances in each location where the fine bounding geometries of the actor and the autonomous vehicle intersect.

15. The autonomous vehicle of claim 10, wherein the instructions further comprises:
  for each of the time subintervals, determine a fine bounding geometry for the actor to obtain the plurality of fine bounding geometries for the actor;
  determine a distance interval that corresponds to the time interval, and subdivide the distance interval on the reference curve into a plurality of distance subintervals;
  for each of the distance subintervals, determine a fine bounding geometry for the autonomous vehicle; and
  identify a plurality of pairs of the time intervals and corresponding distance subintervals and, for each time subinterval and distance subinterval pair:
    determine whether the fine bounding geometry for the actor intersects with the fine bounding geometry for the autonomous vehicle,
    if the fine bounding geometry for the actor does not intersect with the fine bounding geometry for the autonomous vehicle, continue to a next time subinterval, and
    if the fine bounding geometry for the actor intersects with the fine bounding geometry for the autonomous vehicle, predict the lateral offset to a bounding geometry of the actor over the time subinterval at sample locations on the reference curve within the distance subinterval.

16. The autonomous vehicle of claim 10, wherein the instructions to determine the coarse bounding geometry for the autonomous vehicle further includes:
  determining a bounding box for the autonomous vehicle; and
  dilating the bounding box for the autonomous vehicle laterally by a threshold.

17. The autonomous vehicle of claim 16, wherein the instructions to predict the lateral offset distance between the autonomous vehicle and the actor comprise instructions to determine a distance between a bounding box for the autonomous vehicle and a convex hull of the moving actor.

18. The autonomous vehicle of claim 10 wherein the instructions further include:

determine a maximum distance interval length to guarantee a detection range with respect to a reference point on the reference curve determining the distance interval $\delta_{detect} = p - r_{turn}$, in which:

p is the diagonal of a parallelogram $p = \sqrt{a^2 + ab^2 + 2abcos(\Delta\theta)}$, where a and h are sides of the parallelogram:

$$a = d_{front}/\sin(\Delta\theta)$$

$$b = d_{rear}/\sin(\Delta\theta)$$

$d_{front}$ and $d_{rear}$ are distances from the reference point to front and rear of the autonomous vehicle, respectively, and $r_{turn}$ is the turn radius of the reference curve, calculated as $r_{turn} = \Delta s/\Delta\theta$;

for each of the distance subintervals, determine a fine bounding geometry for the autonomous vehicle; and determine whether the fine bounding geometry for the actor intersects with the fine bounding geometry for the autonomous vehicle in any time subinterval and distance subinterval pair.

19. A method of planning a trajectory for an autonomous vehicle, the method comprising:

determining a reference curve that represents a path via which the autonomous vehicle may travel in an environment over a time horizon, receiving, from a perception system of the autonomous vehicle, data representative of an actor that is moving in the environment, segmenting the time horizon into a plurality of time intervals, and for each of the time intervals:

defining a coarse bounding geometry for the actor over the time interval, wherein the coarse bounding geometry encompasses the actor and includes possible position of the actor during the time interval, defining a coarse bounding geometry for the autonomous vehicle over the time interval, wherein the coarse bounding geometry encompasses the autonomous vehicle, determining whether the coarse bounding geometry for the actor will intersect with the coarse bounding geometry of the autonomous vehicle over a distance interval on the reference curve, subdividing the time interval into time subintervals in response to the coarse bounding geometry for the actor intersecting the coarse bounding geometry of the autonomous vehicle, determining a plurality of fine bounding geometries for the actor over the time subintervals and a plurality of fine bounding geometries for the autonomous vehicle over distance subintervals, and predict a lateral offset distance between the reference curve and the actor based on the plurality of fine bounding geometries of the actor and the plurality of fine bounding geometries of the autonomous vehicle; and use the predicted lateral offset distances to determine a trajectory for the autonomous vehicle by:

determining one or more regions of configuration space for the autonomous vehicle that are occupied and one or more regions of configuration space for the autonomous vehicle that are free; and determining a planned trajectory that is fully within a region of free configuration space for the autonomous vehicle and outside of all regions of occupied configuration space for the autonomous vehicle.

20. The method of claim 19 further comprising:

storing the predicted lateral offset distances in a lookup table, wherein using the predicted lateral offset distances to determine a trajectory for the autonomous vehicle comprises retrieving the predicted lateral offset distances from the lookup table when the moving actor is in proximity to the autonomous vehicle.

* * * * *